(12) United States Patent
Botting

(10) Patent No.: US 6,595,471 B1
(45) Date of Patent: Jul. 22, 2003

(54) J-SHAPED FLEXIBLE DUCT HANGER

(75) Inventor: William Andrew Botting, West Alexandria, OH (US)

(73) Assignee: Paramount Concepts, Ltd., Springboro, OH (US)

( * ) Notice: Subject to any disclaimer, the term of this patent is extended or adjusted under 35 U.S.C. 154(b) by 0 days.

(21) Appl. No.: 10/097,172

(22) Filed: Mar. 13, 2002

(51) Int. Cl.[7] ............................................... E21F 17/02
(52) U.S. Cl. ......................................... 248/60; 248/339
(58) Field of Search ............................. 248/60, 58, 62, 248/65, 73, 339, 304, 305, 306

(56) References Cited

U.S. PATENT DOCUMENTS

| | | | |
|---|---|---|---|
| D257,947 S | | 1/1981 | Reynoso |
| 4,407,478 A | * | 10/1983 | Hodges ..................... 248/542 |
| 5,385,320 A | | 1/1995 | Ismert et al. |
| 5,542,631 A | | 8/1996 | Bruno |
| 5,636,819 A | | 6/1997 | Kettlestrings |
| 5,740,994 A | | 4/1998 | Laughlin |
| 5,845,882 A | * | 12/1998 | Hodges et al. ............... 248/59 |
| 5,957,416 A | * | 9/1999 | Sellati ........................ 248/61 |
| 5,961,081 A | | 10/1999 | Rinderer |
| 6,224,025 B1 | | 5/2001 | Alvarez |
| 6,481,673 B1 | * | 11/2002 | Roe et al. ..................... 248/62 |

OTHER PUBLICATIONS

US patent application Publication US 2001/0002689 A1 to Shelton; Pub date Jun. 2001.*
US patent application Publication US 2002/0047073 Ai to Decirity et al.; Pub date Apr. 2002.*

* cited by examiner

Primary Examiner—Ramon O. Ramirez
(74) Attorney, Agent, or Firm—Killworth, Gottman, Hagan & Schaeff

(57) ABSTRACT

A hanger for freely seating a flexible duct. The hanger has a proximal end that can be attached to a support structure, such as a beam or joist, and a distal end with a cradle. The cradle includes a near end defining a transition between the cradle and the distal end, and a remote end opposite the near end such that together they define a duct insertion gap between them. The duct insertion gap is greater than the diameter of the flexible duct such that the duct can be freely seated in the cradle. A duct-engaging surface extends between the near and remote ends of the cradle, and is defined by an exaggerated contact area along at least a portion thereof. The extra surface provided by the exaggerated contact area can engage more of the outer wall surface of the flexible duct, thereby distributing the weight of the duct over a larger area and reducing the likelihood of crimping and sagging such that airflow is not adversely effected.

12 Claims, 4 Drawing Sheets

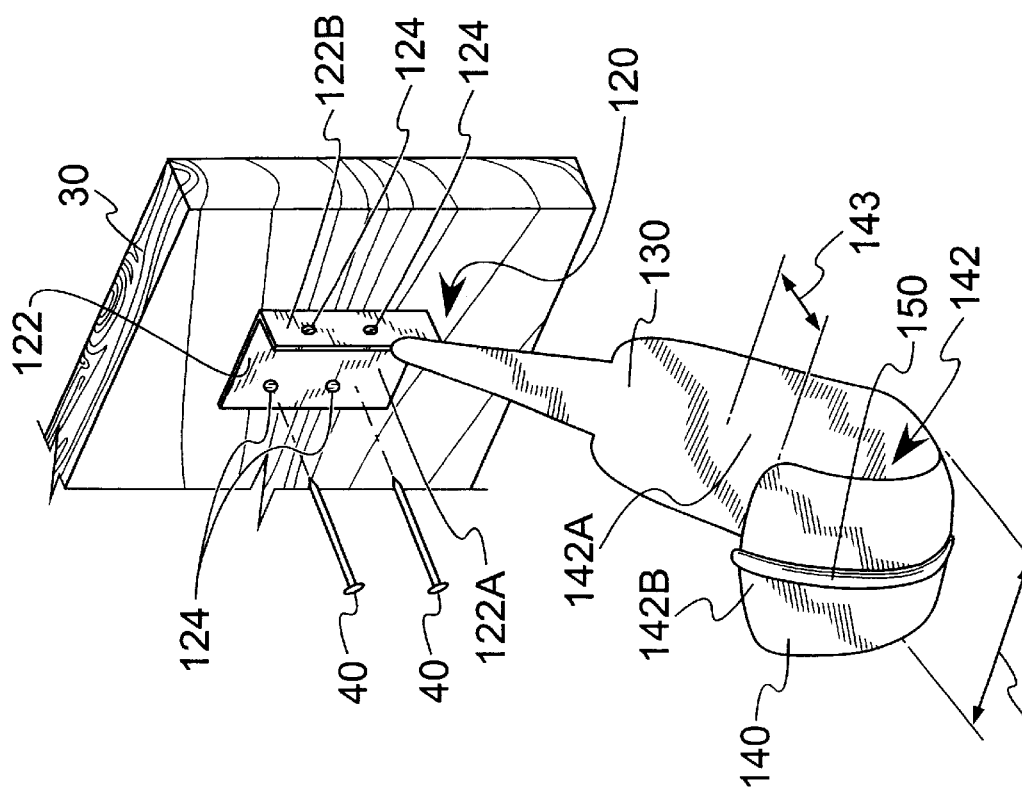
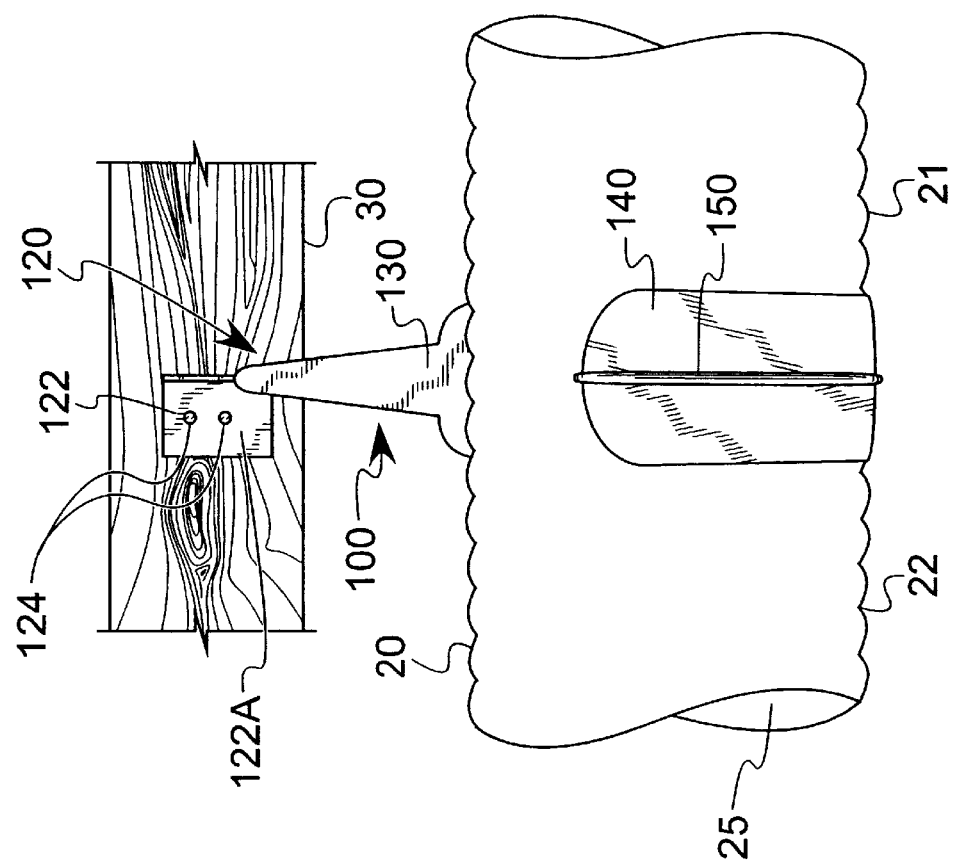
FIG. 4
FIG. 3

J-SHAPED FLEXIBLE DUCT HANGER

BACKGROUND OF THE INVENTION

The present invention relates generally to a hanger for suspending pipes from a support structure, and in particular to a J-shaped hanger for mounting flexible conduit.

The heating, ventilation and air conditioning (HVAC) system is an important part of many dwelling structures. Such a system can be used to heat, cool, purify or otherwise condition air for use by people inside the dwellings. In most HVAC systems, especially those for use in private residential structures, such as houses and apartments, the air is moved from its source to its destination through pipes and related air-handing ductwork, or conduit. The conduit is typically mounted in a relatively unobtrusive location, such as underneath a floor, or from a joist or similar overhead support, using hangers or brackets to secure the conduit to the support structure. In one configuration, the hanger includes a hook or clamp portion to receive the conduit, and a mounting portion opposite the hook or clamp portion for attachment to the support structure. Another configuration involves the use of a simple strap (such as woven plastic) that is cut into appropriate lengths such that the strap could be looped around the conduit with the strap ends brought together and secured to the joist by piercing the ends and the joist with a nail, screw or similar fastener.

Flexible conduit, also called flexible duct, has often been used in HVAC systems in place of traditional rigid pipe or fabricated sheet metal due to its safe and inexpensive manufacture, storage and installation. During the installation of flexible duct in an HVAC system, personnel would typically use a simple strap to mount the duct to a joist. This operation could be unwieldy, as the installer would have to provide temporary support of the duct while concurrently attempting to nail or screw in the strap. This operation is exacerbated by the confined nature of the installation location. Such installation is also potentially dangerous, as the installer is often in an elevated space, where the risk of injury due to falling is significant.

There have been attempts in the art to simplify the steps of installing air-handling conduit through improved hangers. However, most of such activity has focused solely on hangers for rigid conduit. For example, U.S. Pat. No. 4,407,478, issued to Hodges on Oct. 4, 1983, discloses a pipe hanger including a stem portion and a curved portion. The stem portion includes holes to permit attachment of the hanger to a support structure, such as a joist. The curved portion defines an arc into which the pipe is accepted, and is configured such that the pipe can be snap-fit therein due to the presence of a protruding locking lobe. The arc of the curved portion subtends an angle in excess of 180 degrees, so that the remote end of the curved portion must be temporarily flexed outward, thereby allowing the pipe to be secured inside.

Unfortunately, such a configuration does not work well with flexible duct, as the snap-fit can cause crimping of the duct. This crimping can adversely effect the flow and quality of air passing through the duct. Similar problems arise when straps are used to support flexible duct, as the weight of the duct is often sufficient to cause crimping at the location of limited contact surface area due to the strap. Moreover, in either of the above cases, if the duct is subject to movement (due, for example, to vibration), the crimped spot can become weakened, leading to a breech in the duct, with concomitant reduction in airflow to the intended location.

Other related hanger devices use a latch-based mechanism to keep the duct secured within the curved region of the hanger. Additional problems are encountered when the duct needs to be moved for servicing or replacement. In the snap-fit and latched hanger devices, a separate step of unsecuring the duct from the hanger must be undertaken prior to duct removal. As with the installation steps, this operation can be time-consuming and potentially hazardous. In the strap-based hanger devices, the procedure is even more unwieldy, as the person removing the duct must either rip the strap away from the fastener and the joist (possibly resulting in irreparable damage to the strap and necessitating an additional step upon reinstallation), or take the additional time to remove the fastener prior to removing the duct. All of the above devices and methods result in significant increases in the cost and complexity of installed HVAC ductwork.

Accordingly, what is needed is a hanger that will permit the simple support and attachment of flexible duct without unduly impeding the flow of air therein or damaging the duct wall. What is additionally needed is a hanger that will reduce the cost, complexity and risk of installing flexible duct.

BRIEF SUMMARY OF THE INVENTION

This need is met by the present invention, where a hanger for supporting flexible duct is disclosed. According to a first aspect of the invention, a hanger for mounting a flexible duct to a support structure is disclosed. The hanger is defined by a substantially elongate body comprising a proximal end coupled to a distal end. The proximal end is configured to engage the support structure, while the distal end terminates in a cradle. The cradle includes a near end defining a transition between the cradle and the distal end, and a remote end opposite the near end such that together they define a duct insertion gap between them. The duct insertion gap is greater than the diameter of the flexible duct such that the duct can be freely seated in the cradle. As used in the present context, a flexible duct is "freely seated" in a support (such as the aforementioned cradle) when it can be placed onto the support and permitted at least a limited range of motion in the axis from which it was inserted. Thus, in the present invention, if the duct is seated onto the cradle by placing the former onto the duct-engaging surface of the latter from a vertical direction, and no additional latches, snap-fits or other retaining devices are used to prevent the duct from being lifted out of the cradle along the same direction, then the duct is "freely seated" in the cradle, even if the fit within the cradle is fairly snug. A duct-engaging surface extends between the near and remote ends of the cradle, and is defined by an exaggerated contact area along at least a portion thereof. The extra surface provided by the exaggerated contact area can engage more of the outer wall surface of the flexible duct, thereby distributing the weight of the duct over a larger area, thereby reducing the likelihood of crimping and sagging. As used in the present context, an exaggerated component (such as the exaggerated contact area) is one that includes dimensions larger than that required to satisfy minimum load-bearing capabilities.

Optionally, the proximal end of the hanger includes a plurality of apertures configured to accept fasteners, thereby permitting the hanger to be secured to the support structure. The plurality of apertures can be spaced apart at selected distances along the body to accommodate joists (or similar support structure) of varying heights and angular positions. Moreover, the proximal end terminates in a mounting plate such that the plurality of apertures in the proximal end are disposed in the mounting plate. Additionally, the substantially elongate body of the hanger is of one-piece construction, and is preferably made from plastic, such as polypropylene. The hanger may also include at least one longitudinally disposed integral rib to provide increased rigidity. Moreover, the duct-engaging surface of the cradle is curvilinear in shape, and an arc defined by the curvilinear duct-engaging surface subtends an angle up to 180 degrees. The exaggerated contact area, which is used to inhibit sagging and crimping, is between two and four inches wide, and preferably approximately three inches wide at its widest point.

According to another aspect of the invention, a hanger for mounting a flexible duct to a support structure is disclosed. The hanger includes a substantially elongate body with a proximal end configured to engage a support-structure, a distal end with a flexible duct-engaging cradle, and a trunk disposed in between. As with the previous aspect, the cradle includes a near end and a remote end that together define a duct insertion gap large enough to allow the duct to be seated in the cradle while at least two of the three translational degrees of freedom of motion of the flexible duct are preserved. In solid mechanics, a body is capable of six degrees of freedom of motion in a Cartesean coordinate system: three translational degrees corresponding to motion in a conventional x-y-z coordinate space; and three rotational degrees of freedom, each about one of the x, y or z axes. Two or more of the translational degrees of freedom of motion of flexible duct can be constrained by various clamping and latching means, including various forms of snap-fit engagement between the hanger and the duct. By contrast, the present invention preserves at least two of the three translational degrees of freedom of motion through the avoidance of any such clamping and latching. For example, when a length of flexible duct is seated in the cradle of the hanger of the present invention, only the side-to-side motion is limited. The upward vertical motion is uninhibited, thereby allowing simple (i.e., one-handed) insertion and removal of the duct. Similarly, the longitudinal movement of the duct along the flowpath is largely preserved, as the lack of a clamping device combined with the large surface attributable to the exaggerated contact area permits the outer wall of the duct to slide relative thereto while discouraging the tendency of the outer wall to snag or otherwise catch. Depending on the size of the flexible duct relative to the cradle, the frictional fit between the outer wall of the flexible duct and the duct-engaging surface can be sufficient to inhibit excessive relative sliding motion between the two; however, such friction does not appreciably detract from ease of use, as the nature of the contact still permits one-handed duct repositioning.

According to another aspect of the invention, a method of hanging flexible duct is disclosed. The method comprises the steps of configuring a hanger to include a proximal end and a distal end, securing the hanger to a support structure, and placing flexible duct in a cradle of the distal end of the hanger. The proximal end is used to engage the support structure, while the distal end is coupled to the proximal end. The cradle includes a near end and a remote end, where the near end defines a transition between the cradle and the distal end, and the remote end is opposite the near end. A duct insertion gap is defined by the space between the remote and near ends, and is greater than the diameter of the duct such that the duct can be freely seated in the cradle. A ductengaging surface is part of the cradle, and extends between the near and remote ends. The duct-engaging surface is defined by an exaggerated contact area along at least a portion thereof. Preferably, the step of securing the hanger to the support structure precedes the step of placing the flexible duct in the cradle.

According to another aspect of the invention, a J-shaped hanger for mounting a flexible duct is disclosed. The hanger defined by one-piece plastic construction and includes a proximal end, a distal end and a trunk disposed between the proximal and distal ends. The proximal end of the hanger is adapted to attach the hanger to a support structure (such as a joist), while the distal end is coupled to the proximal end via the trunk. The distal end terminates in a cradle that is configured to engage the flexible duct. The cradle is made up of a near end defining a transition point from the trunk to the distal end, and a remote end opposite the near end such that the near end and the remote end define a duct insertion gap. As with the first aspect of the invention, the duct insertion gap is greater than the diameter of the flexible duct such that the duct can be freely seated in a duct-engaging surface of the cradle. In addition, the duct-engaging surface extends between the cradle near end and remote end such that an arc defined by the surface subtends an angle of up to 180 degrees, thereby allowing insertion of the duct without having to temporarily flex the remote end of the cradle outward to get the duct past the duct insertion gap. At least a portion of the duct-engaging surface is defined by an exaggerated contact area. The hanger further includes at least one longitudinally disposed integral rib extending substantially between the proximal and distal ends thereof.

BRIEF DESCRIPTION OF THE SEVERAL VIEWS OF THE DRAWINGS

FIG. 3 is a front elevation view of the hanger of FIG. 2, showing the exaggerated contact area between the hanger and the flexible duct;

FIG. 4 is a perspective view of the hanger of FIG. 2 with the flexible duct removed;

DETAILED DESCRIPTION OF THE PREFERRED EMBODIMENTS

Figure 1:
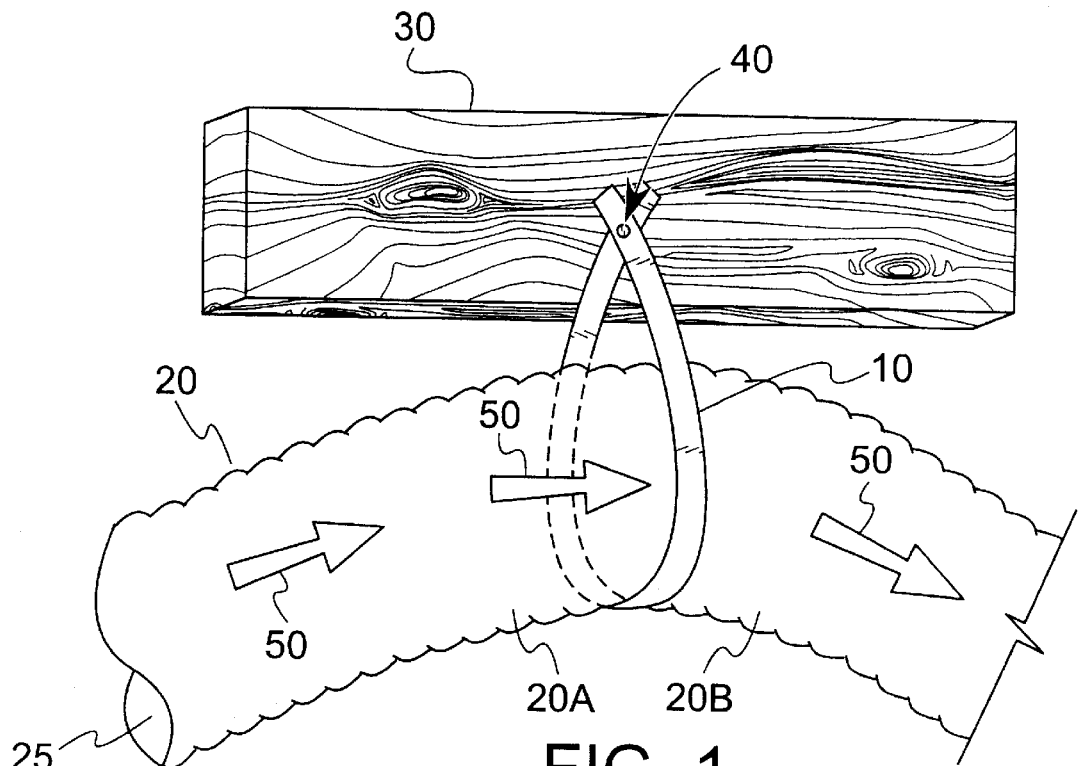
FIG. 1 is a perspective view of a section of flexible duct supported by a strap in accordance with the prior art.

Referring to FIG. 1, a prior art strap 10 used as a hanger for flexible duct 20 is shown. The strap 10 is typical of any conventional material with suitable structural properties, such as woven nylon or related plastic. Joist 30 is used to provide support for the hanger 10 through a fastener 40, which is typically in the form of a nail, screw or staple. To vertically suspend the duct 20 from the joist 30, the installer must first loop a length of strap 10 of appropriate length around the duct 20, then fasten the loop to the joist 30 with a free hand, all the while making sure that the duct is maintained at its intended vertical position.

Duct 20 is conventionally made of one or more layers of plastic material, and may optionally have one or more layers of insulation, structurally reinforcing material (such as helical wires, discussed in more detail below), or the like. Airflow 50 is routed through the inner flowpath 25 of duct 20 to various termination points (not shown) within the HVAC system. The weight of the duct 20, although not great, is sufficient to cause the unsupported portions 20A, 20B adjacent the strap 10 to sag, resulting in a crimping and subsequent reduction in the cross-sectional area of the inner flowpath 25. In addition to upsetting the balance of flow to the desired termination point (such as a ventilation register, not shown), the crimping can cause a weakening of the walls of the duct 20, which can lead to premature component failure. Wear is even quicker in the presence of relative motion between the strap 10 and duct 20, such as due to vibration or surges in the duct due to normal HVAC cycling. Similar problems can arise from the use of a rigid hanger that exploits snap-fit or related clamping devices (neither of which are shown), as the force exerted at the contact locations of a flexible duct can produce comparable crimping.

Figure 2:
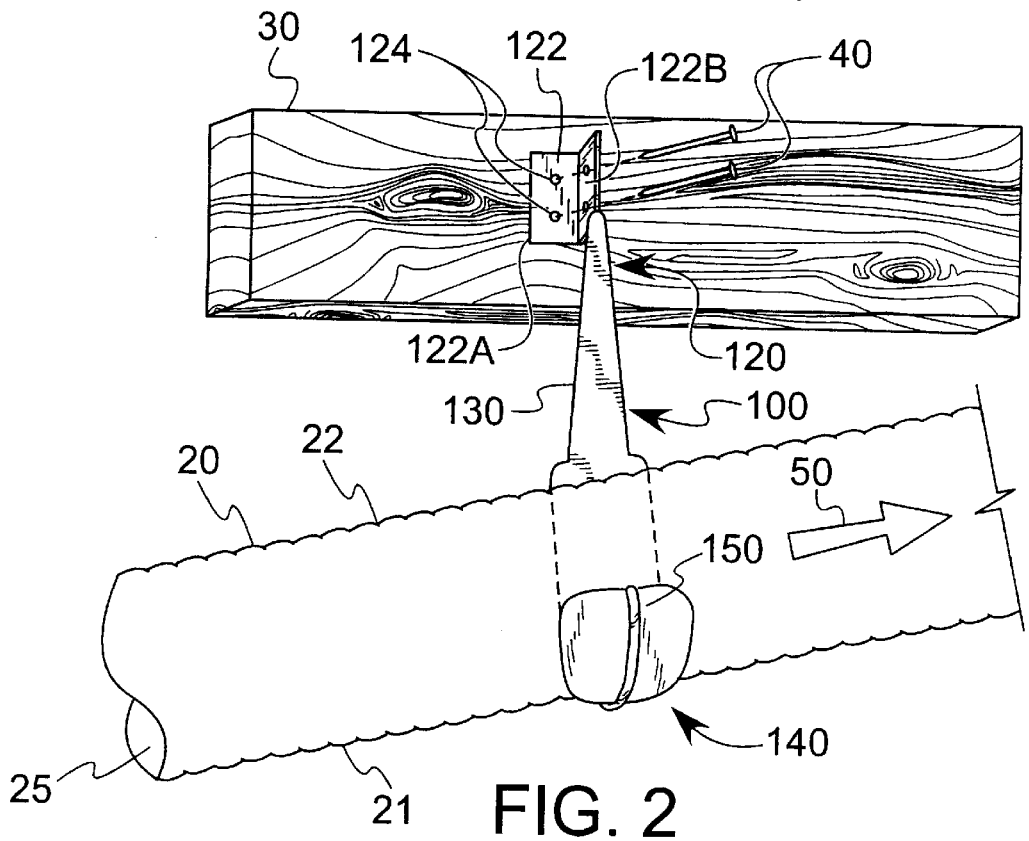
FIG. 2 is a perspective view of a section of flexible duct supported by a hanger in accordance with the present invention.
Figure 5:
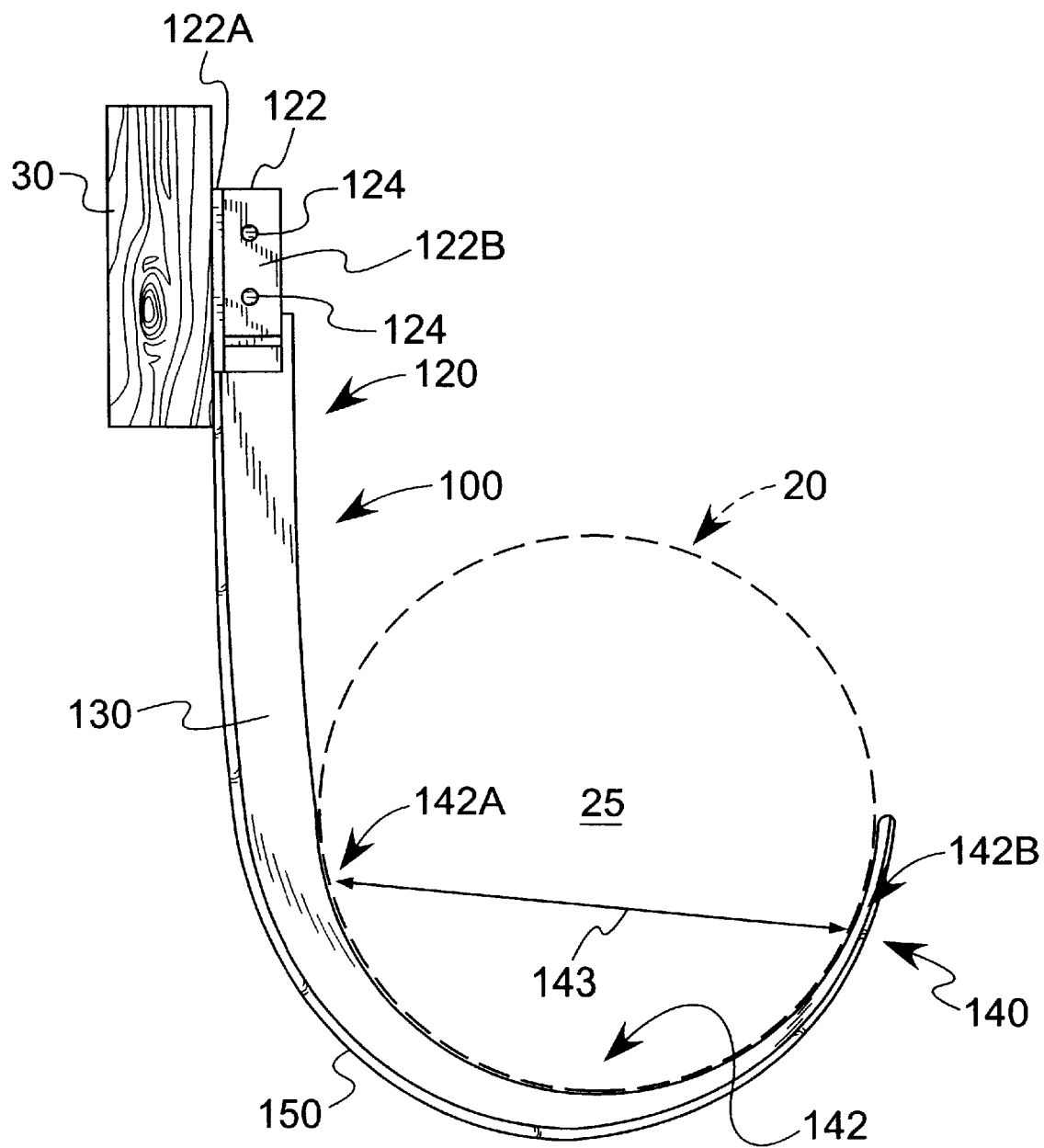
FIG. 5 is a side elevation view of the hanger of FIG. 2.
Figure 6:
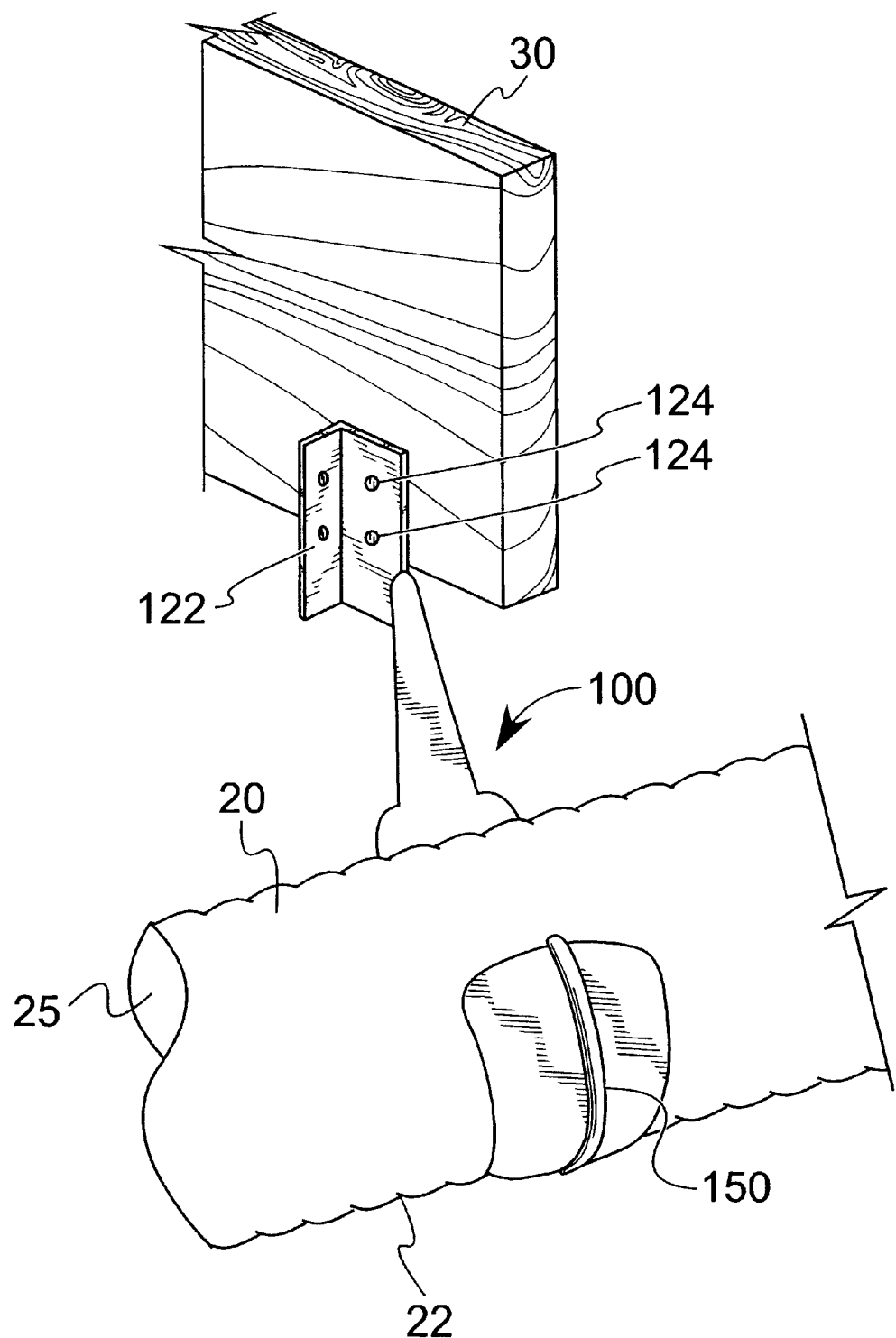
FIG. 6 is a perspective view showing the hanger being mounted to a joist along an orthogonal direction to that of FIGS. 2–5.

As shown in FIGS. 2 through 6, the hanger 100 according to the present invention includes a substantially elongate body made up of a proximal end 120, trunk 130 and distal end 140. The proximal end 120 terminates in an L-shaped mounting plate 122 that is used to mount the hanger 100 to a joist 30. The orthogonally-onriented surfaces 122A, 122B of mounting plate 122 each contain a plurality of apertures 124 through which conventional fasteners (such as nails or screws 40) can be inserted to secure the hanger 100 to the joist 30. Thus, for example, if the installer wants to have the flexible duct 20 run parallel to the support joist 30, fasteners 40 would be used to secure the two through surface 122A, as shown in FIGS. 2–5. Thus, by mounting hanger 100 such that surface 122A is against joist 30, the duct 20 will have its longitudinal axis substantially parallel to the longitudinal dimension of joist 30. If, on the other hand, the installer prefers to have the flexible duct 20 run across the support joist 30, fasteners 40 would be used to secure the two through surface 122B, as shown in FIG. 6. In this orientation, where surface 122B is against joist 30, the duct 20 will have its longitudinal axis substantially perpendicular to the longitudinal dimension of joist 30. The apertures 124, combined with the elongate body of hanger 100 permit mounting to support structure 30 of varying heightwise dimensions. As shown with particularity in FIG. 4, the hanger 100 defines a J-shaped construction due to distal end 140 terminating in a cradle 142 that curves upward from the bottom of trunk 130. The cradle includes a near end 142A and a remote end 142B that together form a duct insertion gap 143. The radius of curvature of the preferably curvilinear cradle 142 is such that the flexible duct (not presently shown) can fit through duct insertion gap 143 and be seated securely in the cradle 142 without having to rely on a clamp, latch, hook or related snap fit. A taper can start at the proximal end 120 and widens through the trunk 130 until it reaches a shoulder portion, after which it reaches its maximum lateral dimension throughout exaggerated contact area 144 of the distal end 140. This provides additional surface area upon which the duct can freely rest, acts to reduce the pressure (defined as the force due to weight of duct divided by the contact area) imparted to the outer wall 21 of the duct 20 from the hanger 100. This can be especially beneficial with supporting ducts 20 that are internally reinforced with a helical wire (not shown, but capable of producing slight external surface undulations 22 in duct 20, as shown in FIGS. 1–3). The exaggerated contact are 144 of the hanger 100 preferably extends along the length of hanger 100 a sufficient distance to provide both vertical and lateral support of duct 20. In applications where the duct 20 is reinforced, the vertical support of exaggerated contact are 144 undergirds a plurality of helical wires in the duct, thereby offering improved resistance to duct sagging and crimping. By reducing the amount of sagging and crimping in the duct 20, the hanger 100 of the present invention reduces the likelihood of airflow compromise or outer wall 21 damage. An additional benefit is that spacing between adjacent hangers can be increased such that fewer hangers may be needed. One or more integral ribs 150 are disposed along the longitudinal dimension of the hanger 100 such that the stiffness of the hanger is improved, especially along the weight-bearing portion defined by the cradle 142.

The installer's task of securing the hanger 100 to the joist 30 is considerably simplified when done independent of the duct 20, as the rigid, lightweight construction of hanger 100 facilitates the placement of the hanger adjacent the joist 30 until such time as a fastener 40 can be affixed to the joist through apertures 124. In addition, accuracy in placement can be enhanced, as movement or slippage during mounting is reduced. By having the spacing defined by duct insertion gap 143 be larger than the diameter of the duct 20, the seating and removal of the duct is a simple matter of vertically lowering or lifting the duct 20 into or out of the cradle 142. By avoiding the use of a clamp, latch or related snap-fit device in the hanger 100 of the present invention, not only is the difficulty of using two hands to perform the installation abrogated, but the design and manufacture of the hanger 100 is simplified, thus reducing overall costs. Equally important are the benefits such design provides upon duct removal, as there is no need to disturb the fasteners 40 or damage the hanger 100 to retrieve the duct, and the one-handed ease with which the duct can be unseated keeps maintenance times to a minimum.

Preferably, the hanger 100 is made out of durable plastic, such as an injectionmolded plastic that can be of single-piece construction. By way of example, the plastic can be polypropylene. The trunk 130 connects the proximal end 120 to distal end 140, and provides most of the structural backbone of the hanger 100. The shape of the trunk 130 is preferably that it starts off narrow near the proximal end 120 and broadens to a shoulder such that it is substantially as wide at distal end 140 as it is at the beginning of the shoulder. It will be appreciated, however, that the precise dimensions of trunk 130 are determined more for load-bearing and load-spreading capability, accordingly, any suitable shape may be utilized.

Having described the invention in detail and by reference to preferred embodiments thereof, it will be apparent that modifications and variations are possible without departing from the scope of the invention defined in the appended claims.

I claim:

1. An HVAC hanger for mounting a flexible heating, ventilation and air conditioning duct to a support structure, said hanger defined by a substantially elongate body comprising:

a proximal end configured to engage said support structure, said proximal end terminating in a mounting plate, said mounting plate defining a plurality of apertures therein, said apertures configured to accept fasteners therethrough such that said hanger can be secured to said support structure, said mounting plate comprising a plurality of orthogonally-oriented surfaces that permit, upon mounting a first of said plurality of orthogonally-oriented surfaces against said support structure, a longitudinal axis of said flexible duct to be oriented parallel to a longitudinal axis of said support structure, and upon mounting a second of said plurality of orthogonally-oriented surfaces against said support structure, a longitudinal axis of said flexible duct to be oriented perpendicular to a longitudinal axis of said support structure; and a distal end coupled to and opposite said proximal end, said distal end terminating in a cradle, said cradle configured to engage said flexible duct and including:

a near end defining a transition between said cradle and said distal end;

a remote end opposite said near end such that said near end and said remote end define a duct insertion gap therebetween, where said duct insertion gap is greater than the diameter of said duct such that said duct can be freely seated in said cradle; and a duct-engaging surface extending between said near end and said remote end, said duct-engaging surface defined by an exaggerated contact area along at least a portion thereof.

2. A hanger according to claim 1, wherein said substantially elongate body is of one-piece construction.

3. A hanger according to claim 1, where said substantially elongate body is plastic.

4. A hanger according to claim 1, further comprising at least one longitudinally disposed integral rib to provide increased rigidity to said hanger.

5. A hanger according to claim 1, wherein said duct-engaging surface is curvilinear in shape.

6. A hanger according to claim 5, wherein an arc defined by said curvilinear duct-engaging surface subtends an angle up to 180 degrees.

7. A hanger according to claim 1, wherein said exaggerated contact area is between two and four inches wide at its widest point.

8. A hanger according to claim 7, wherein said exaggerated contact area is approximately three inches wide at its widest point.

9. A method of mounting a flexible HVAC duct to a support structure, said method comprising the steps of:

configuring a hanger to include:

a proximal end configured to engage said support structure, said proximal end comprising a plurality of orthogonally-oriented surfaces each defining a plurality of apertures therein to enable said hanger to be selectively mounted to said support structure in one of two orthogonally-oriented dimensions, each of said dimensions aligned with its respective one of said plurality of orthogonally-oriented surfaces; and a distal end coupled to and opposite said proximal end, said distal end terminating in a cradle, said cradle configured to engage said flexible duct and including:

a near end defining a transition point from said cradle to said distal end;

a remote end opposite said near end such that said near end and said remote end define a duct insertion gap therebetween, where said duct insertion gap is greater than the diameter of said duct such that said duct can be freely seated in said cradle; and a duct-engaging surface extending between said near end and said remote end, said duct-engaging surface defined by an exaggerated contact area along at least a portion thereof;

securing said hanger to said support structure; and placing said flexible duct in said cradle of said hanger.

10. A method according to claim 9, wherein said step of securing said hanger to said support structure precedes said step of placing said flexible duct in said cradle.

11. A method according to claim 9, wherein said step of securing said hanger to said support structure comprises mounting a t surface of a plurality of orthogonally-oriented surfaces on said mounting plate such that when said flexible duct is placed in said hanger, said longitudinal axis of said flexible duct is oriented parallel to a longitudinal axis of said support structure.

12. A method according to claim 9, wherein said step of securing said hanger to said support structure comprises mounting a second surface of a plurality of orthogonally-oriented surfaces on said mounting plate such that when said flexible duct is placed in said hanger, said longitudinal axis of said flexible duct is oriented perpendicular to a longitudinal axis of said support structure.

* * * * *

UNITED STATES PATENT AND TRADEMARK OFFICE
CERTIFICATE OF CORRECTION

PATENT NO.      : 6,595,471 B1
DATED           : July 22, 2003
INVENTOR(S)     : William Andrew Botting It is certified that error appears in the above-identified patent and that said Letters Patent is hereby corrected as shown below:

<u>Column 8,</u>
Line 28, reads "mounting a t surface" should read -- mounting a first surface --

Signed and Sealed this

Eleventh Day of November, 2003

JAMES E. ROGAN
*Director of the United States Patent and Trademark Office*